United States Patent
Ichikawa et al.

(10) Patent No.: US 9,697,952 B2
(45) Date of Patent: Jul. 4, 2017

(54) NON-CONTACT ELECTRIC POWER RECEPTION DEVICE, NON-CONTACT ELECTRIC POWER TRANSMISSION DEVICE, AND NON-CONTACT ELECTRIC POWER TRANSMISSION AND RECEPTION SYSTEM

(75) Inventors: Shinji Ichikawa, Toyota (JP); Satoru Horiuchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 577 days.

(21) Appl. No.: 14/352,516

(22) PCT Filed: Oct. 27, 2011

(86) PCT No.: PCT/JP2011/074803
§ 371 (c)(1),
(2), (4) Date: Apr. 17, 2014

(87) PCT Pub. No.: WO2013/061441
PCT Pub. Date: May 2, 2013

(65) Prior Publication Data
US 2014/0285029 A1    Sep. 25, 2014

(51) Int. Cl.
*B60L 11/18* (2006.01)
*H02J 7/02* (2016.01)
(Continued)

(52) U.S. Cl.
CPC .............. *H01F 38/14* (2013.01); *B60L 7/14* (2013.01); *B60L 11/005* (2013.01); *B60L 11/14* (2013.01);
(Continued)

(58) Field of Classification Search
CPC .. H02J 50/12; H02J 50/90; H02J 50/80; H02J 50/50; H02J 7/025; H02J 5/005;
(Continued)

(56) References Cited

U.S. PATENT DOCUMENTS

| | | |
|---|---|---|
| 7,741,734 B2 | 6/2010 | Joannopoulos et al. |
| 2007/0222542 A1 | 9/2007 | Joannopoulos et al. |

(Continued)

FOREIGN PATENT DOCUMENTS

| | | |
|---|---|---|
| AU | 2006269374 B2 | 1/2007 |
| AU | 2006269374 C1 | 1/2007 |

(Continued)

OTHER PUBLICATIONS

Translation of Jan. 27, 2015 Office Action issued in Japanese Patent Application No. 2013-540576.

*Primary Examiner* — Ryan Johnson
(74) *Attorney, Agent, or Firm* — Oliff PLC

(57) ABSTRACT

The non-contact electric power reception device includes an electric power reception portion and an electric load device. The electric power reception portion is configured such that best transmission efficiency at a power supply frequency of the power supply portion used for non-contact electric power transmission is achieved when the electric power reception portion is arranged with its position being displaced from a position of the electric power transmission portion. Preferably, the electric power reception portion is configured such that a peak frequency at which transmission efficiency at the time of change in power transmission frequency exhibits a peak and a power supply frequency match with each other when the electric power reception portion is arranged with positions in a horizontal direction of a central axis of the electric power reception portion and a central axis of the electric power transmission portion being displaced from each other.

22 Claims, 8 Drawing Sheets

(51) Int. Cl.

| | | |
|---|---|---|
| H02J 17/00 | (2006.01) | |
| H01F 38/14 | (2006.01) | |
| H02J 50/12 | (2016.01) | |
| H02J 50/90 | (2016.01) | |
| H02J 5/00 | (2016.01) | |
| B60L 7/14 | (2006.01) | |
| B60L 11/00 | (2006.01) | |
| B60L 11/14 | (2006.01) | |
| B60L 15/20 | (2006.01) | |
| H02J 7/00 | (2006.01) | |

(52) U.S. Cl.
CPC ......... *B60L 11/182* (2013.01); *B60L 11/1824* (2013.01); *B60L 11/1829* (2013.01); *B60L 11/1833* (2013.01); *B60L 11/1846* (2013.01); *B60L 11/1861* (2013.01); *B60L 15/2009* (2013.01); *H02J 5/005* (2013.01); *H02J 7/025* (2013.01); *H02J 50/12* (2016.02); *H02J 50/90* (2016.02); *B60L 2210/10* (2013.01); *B60L 2210/30* (2013.01); *B60L 2210/40* (2013.01); *B60L 2220/14* (2013.01); *B60L 2240/423* (2013.01); *B60L 2240/547* (2013.01); *B60L 2240/549* (2013.01); *H02J 7/0004* (2013.01); *Y02T 10/645* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ..... H02J 17/00; B60L 11/182; B60L 11/1829; H01F 38/14
See application file for complete search history.

(56) References Cited

U.S. PATENT DOCUMENTS

| | | |
|---|---|---|
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0219695 A1 | 9/2010 | Komiyama et al. |
| 2010/0225175 A1 | 9/2010 | Karalis et al. |
| 2010/0225271 A1 | 9/2010 | Oyobe et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0049995 A1 | 3/2011 | Hashiguchi |
| 2011/0140653 A1 | 6/2011 | Jung et al. |
| 2011/0273025 A1 | 11/2011 | Amano et al. |
| 2012/0032521 A1 | 2/2012 | Inoue et al. |
| 2012/0153739 A1* | 6/2012 | Cooper ................ H02J 7/025 307/104 |

FOREIGN PATENT DOCUMENTS

| | | | |
|---|---|---|---|
| AU | 2007349874 A2 | 10/2008 | |
| AU | 2010200044 A1 | 1/2010 | |
| CA | 2 615 123 A1 | 1/2007 | |
| CA | 2 682 284 A1 | 10/2008 | |
| CN | 101258658 A | 9/2008 | |
| CN | 101682216 A | 3/2010 | |
| CN | 101820188 A | 9/2010 | |
| CN | 101860089 A | 10/2010 | |
| CN | 102005827 A | 4/2011 | |
| CN | 102186695 A | 9/2011 | |
| EP | 1 902 505 A2 | 3/2008 | |
| EP | 2 130 287 A1 | 12/2009 | |
| FR | 2 947 113 A1 | 12/2010 | |
| FR | 2947113 A1 * | 12/2010 | ............ B60L 11/182 |
| IN | 735/DELNP/2008 | 5/2008 | |
| IN | 6195/DELNP/2009 | 7/2010 | |
| JP | A-2009-501510 | 1/2009 | |
| JP | A-2009-106136 | 5/2009 | |
| JP | 2009-164293 A | 7/2009 | |
| JP | 2010-098257 A | 4/2010 | |
| JP | A-2010-141976 | 6/2010 | |
| JP | A-2010-193598 | 9/2010 | |
| JP | A-2011-050140 | 3/2011 | |
| JP | A-2011-097671 | 5/2011 | |
| JP | 2011-166994 A | 8/2011 | |
| JP | 2013-013275 A | 1/2013 | |
| KR | 2008-0031398 A | 4/2008 | |
| KR | 2010-0015954 A | 2/2010 | |
| WO | WO 2007/008646 A2 | 1/2007 | |
| WO | WO 2008/118178 A1 | 10/2008 | |
| WO | 2010/122389 A1 | 10/2010 | |
| WO | 2011/098888 A2 | 8/2011 | |

\* cited by examiner

NON-CONTACT ELECTRIC POWER RECEPTION DEVICE, NON-CONTACT ELECTRIC POWER TRANSMISSION DEVICE, AND NON-CONTACT ELECTRIC POWER TRANSMISSION AND RECEPTION SYSTEM

TECHNICAL FIELD

This invention relates to a non-contact electric power reception device, a non-contact electric power transmission device, and a non-contact electric power transmission and reception system.

BACKGROUND ART

In recent years, energy transmission using a magnetic field resonant method has attracted attention as a technique allowing non-contact transmission of electric energy. With the magnetic resonant method, it has been known that electric power can be transmitted even though a distance between an electric power transmission portion and an electric power reception portion is greater than in an electromagnetic induction method.

In the magnetic resonant method, however, there is an optimal distance, and if a distance is too short, transmission efficiency is lowered. Japanese Patent Laying-Open No. 2011-50140 (PTD 1) discloses a technique with which high transmission efficiency can be maintained even though a distance between a transmission side and a reception side of electric power decreases to establish a close coupling state in a case that electric power is transmitted and received in a non-contact manner with the use of the resonant method.

According to a non-contact electric power transmission device disclosed in this document, in such a configuration that AC power from an AC power supply is supplied to a resonant element so that magnetic field is generated in the resonant element and AC power is supplied to an electric power reception device which becomes a receiving counterpart as a result of resonance, an automatic matching device is provided between the AC power supply and the resonant element. The automatic matching device adjusts impedance of the resonant element in accordance with a coefficient of coupling with the electric power reception device which is a target of supply of AC power.

CITATION LIST

Patent Document

PTD 1: Japanese Patent Laying-Open No. 2011-50140
PTD 2: Japanese Patent Laying-Open No. 2010-141976
PTD 3: Japanese Patent Laying-Open No. 2010-193598

SUMMARY OF INVENTION

Technical Problem

According to a design approach disclosed in Japanese Patent Laying-Open No. 2011-50140 above, a resonant coil is designed such that electric power can be transmitted at maximum efficiency at the time when positional relation between an electric power transmission device and an electric power reception device is in an ideal state. Then, when positional relation is disrupted, for example, when a distance becomes too short to establish a close coupling state, the automatic matching device adjusts impedance to thereby improve transmission efficiency.

Though such a design approach is suitable for a non-contact electric power reception device which is light in weight and easy in registration such as a portable device, some position displacement should be permitted in a case of application to a vehicle or the like for which registration between electric power transmission and reception portions is not easy. Therefore, there are few opportunities that electric power can be transmitted at maximum efficiency.

Rather, a system should be constructed such that efficiency does not lower in spite of position displacement while position displacement to some extent is permitted.

An object of this invention is to provide a non-contact electric power reception device, a non-contact electric power transmission device, and a non-contact electric power transmission and reception system in which efficiency is less likely to lower even though position displacement between an electric power transmission device and an electric power reception device takes places.

Solution to Problem

In summary, this invention is directed to a non-contact electric power reception device for receiving in a non-contact manner, electric power transferred from an electric power transmission device. The electric power transmission device includes an electric power transmission portion and a power supply portion for supplying AC power to the electric power transmission portion. The non-contact electric power reception device includes an electric power reception portion receiving electric power in a non-contact manner from the electric power transmission portion and an electric load device using electric power received by the electric power reception portion. The electric power reception portion is configured to achieve best transmission efficiency at a power supply frequency of the power supply portion used for non-contact electric power transmission when the electric power reception portion is arranged with its position being displaced from a position of the electric power transmission portion.

Preferably, the electric power reception portion is configured such that a peak frequency at which transmission efficiency at the time of change in electric power transmission frequency exhibits a peak and the power supply frequency match with each other when the electric power reception portion is arranged with positions in a horizontal direction of a central axis of the electric power reception portion and a central axis of the electric power transmission portion being displaced from each other.

More preferably, the electric power reception portion is configured to have peaks at which transmission efficiency is higher than transmission efficiency at the power supply frequency, at at least two locations of a first frequency higher than the power supply frequency and a second frequency lower than the power supply frequency, when the electric power reception portion is arranged with positions in the horizontal direction of the central axis of the electric power reception portion and the central axis of the electric power transmission portion matching with each other.

Further preferably, the non-contact electric power reception device further includes a matching device provided between the electric power reception portion and the electric load device, for adjusting impedance of the non-contact electric power reception device, and a control device causing the matching device to adjust impedance of the non-contact electric power reception device when the electric power reception portion is arranged with positions in the horizontal direction of the central axis of the electric power reception portion and the central axis of the electric power transmission portion matching with each other.

Further preferably, the non-contact electric power reception device further includes a matching device provided between the electric power reception portion and the electric load device, for adjusting impedance of the non-contact electric power reception device, and a control device causing the matching device to adjust impedance of the non-contact electric power reception device when the electric power reception portion is arranged with positions in the horizontal direction of the central axis of the electric power reception portion and the central axis of the electric power transmission portion being displaced from each other.

Preferably, the electric power reception portion is configured to have peaks at which transmission efficiency is higher than transmission efficiency at the power supply frequency, at at least two locations of a first frequency higher than the power supply frequency and a second frequency lower than the power supply frequency, when the electric power reception portion is arranged with positions in a horizontal direction of a central axis of the electric power reception portion and a central axis of the electric power transmission portion matching with each other.

Preferably, the non-contact electric power reception device further includes a matching device provided between the electric power reception portion and the electric load device, for adjusting impedance of the non-contact electric power reception device, and a control device causing the matching device to adjust impedance of the non-contact electric power reception device when the electric power reception portion is arranged with positions in a horizontal direction of a central axis of the electric power reception portion and a central axis of the electric power transmission portion matching with each other.

Preferably, the non-contact electric power reception device further includes a matching device provided between the electric power reception portion and the electric load device, for adjusting impedance of the non-contact electric power reception device, and a control device causing the matching device to adjust impedance of the non-contact electric power reception device when the electric power reception portion is arranged with positions in a horizontal direction of a central axis of the electric power reception portion and a central axis of the electric power transmission portion being displaced from each other.

Preferably, the electric power reception portion is configured such that a difference in natural frequency from the electric power transmission portion is within ±10%.

More preferably, a coefficient of coupling between the electric power reception portion and the electric power transmission portion is not greater than 0.1.

More preferably, the electric power transmission portion transmits electric power to the electric power reception portion through at least one of magnetic field formed between the electric power reception portion and the electric power transmission portion and oscillating at a specific frequency and electric field formed between the electric power reception portion and the electric power transmission portion and oscillating at a specific frequency.

In another aspect, this invention is directed to a non-contact electric power transmission device for transmitting electric power in a non-contact manner to an electric power reception device. The electric power reception device includes an electric power reception portion and an electric load device receiving electric power from the electric power reception portion. The non-contact electric power transmission device includes an electric power transmission portion transmitting electric power in a non-contact manner to the electric power reception portion and a power supply portion for supplying AC power to the electric power transmission portion. The electric power transmission portion is configured to achieve best transmission efficiency at a power supply frequency of the power supply portion used for non-contact electric power transmission when the electric power reception portion is arranged with its position being displaced from a position of the electric power transmission portion.

Preferably, the electric power transmission portion is configured such that a peak frequency at which transmission efficiency at the time of change in electric power transmission frequency exhibits a peak and the power supply frequency match with each other when the electric power reception portion is arranged with positions in a horizontal direction of a central axis of the electric power reception portion and a central axis of the electric power transmission portion being displaced from each other.

More preferably, the electric power transmission portion is configured to have peaks at which transmission efficiency is higher than transmission efficiency at the power supply frequency, at at least two locations of a first frequency higher than the power supply frequency and a second frequency lower than the power supply frequency, when the electric power reception portion is arranged with positions in the horizontal direction of the central axis of the electric power reception portion and the central axis of the electric power transmission portion matching with each other.

Further preferably, the non-contact electric power transmission device further includes a matching device provided between the electric power transmission portion and the power supply portion, for adjusting impedance of the non-contact electric power transmission device, and a control device causing the matching device to adjust impedance of the non-contact electric power transmission device when the electric power reception portion is arranged with positions in the horizontal direction of the central axis of the electric power reception portion and the central axis of the electric power transmission portion matching with each other.

Further preferably, the non-contact electric power transmission device further includes a matching device provided between the electric power transmission portion and the power supply portion, for adjusting impedance of the non-contact electric power transmission device, and a control device causing the matching device to adjust impedance of the non-contact electric power transmission device when the electric power reception portion is arranged with positions in the horizontal direction of the central axis of the electric power reception portion and the central axis of the electric power transmission portion being displaced from each other.

Preferably, the electric power transmission portion is configured to have peaks at which transmission efficiency is higher than transmission efficiency at the power supply frequency at at least two locations of a first frequency higher than the power supply frequency and a second frequency lower than the power supply frequency, when the electric power reception portion is arranged with positions in a horizontal direction of a central axis of the electric power reception portion and a central axis of the electric power transmission portion matching with each other.

Preferably, the non-contact electric power transmission device further includes a matching device provided between the electric power transmission portion and the power supply portion, for adjusting impedance of the non-contact electric power transmission device, and a control device causing the matching device to adjust impedance of the non-contact electric power transmission device when the electric power reception portion is arranged with positions in a horizontal direction of a central axis of the electric power reception portion and a central axis of the electric power transmission portion matching with each other.

Preferably, the non-contact electric power transmission device further includes a matching device provided between the electric power transmission portion and the power supply portion, for adjusting impedance of the non-contact electric power transmission device, and a control device causing the matching device to adjust impedance of the non-contact electric power transmission device when the electric power reception portion is arranged with positions in a horizontal direction of a central axis of the electric power reception portion and a central axis of the electric power transmission portion being displaced from each other.

Preferably, the electric power transmission portion is configured such that a difference in natural frequency from the electric power reception portion is within ±10%.

More preferably, a coefficient of coupling between the electric power reception portion and the electric power transmission portion is not greater than 0.1.

More preferably, the electric power transmission portion transmits electric power to the electric power reception portion through at least one of magnetic field formed between the electric power reception portion and the electric power transmission portion and oscillating at a specific frequency and electric field formed between the electric power reception portion and the electric power transmission portion and oscillating at a specific frequency.

In yet another aspect, this invention is directed to a non-contact electric power transmission and reception system including a non-contact electric power transmission device and a non-contact electric power reception device for receiving in a non-contact manner, electric power transferred from the non-contact electric power transmission device. The non-contact electric power transmission device includes an electric power transmission portion and a power supply portion for supplying AC power to the electric power transmission portion. The non-contact electric power reception device includes an electric power reception portion equal in natural frequency to the electric power transmission portion and an electric load device using electric power received by the electric power reception portion. The electric power reception portion is configured to achieve best transmission efficiency at a power supply frequency of the power supply portion used in non-contact electric power transmission when the electric power reception portion is arranged with its position being displaced from a position of the electric power transmission portion.

Preferably, the electric power reception portion is configured such that a difference in natural frequency from the electric power transmission portion is within ±10%.

More preferably, a coefficient of coupling between the electric power reception portion and the electric power transmission portion is not greater than 0.1.

More preferably, the electric power transmission portion transmits electric power to the electric power reception portion through at least one of magnetic field formed between the electric power reception portion and the electric power transmission portion and oscillating at a specific frequency and electric field formed between the electric power reception portion and the electric power transmission portion and oscillating at a specific frequency.

Advantageous Effects of Invention

According to the present invention, even though position displacement to some extent between an electric power transmission device and an electric power reception device takes place, extreme lowering in efficiency can be prevented.

DESCRIPTION OF EMBODIMENTS

Figure 1:
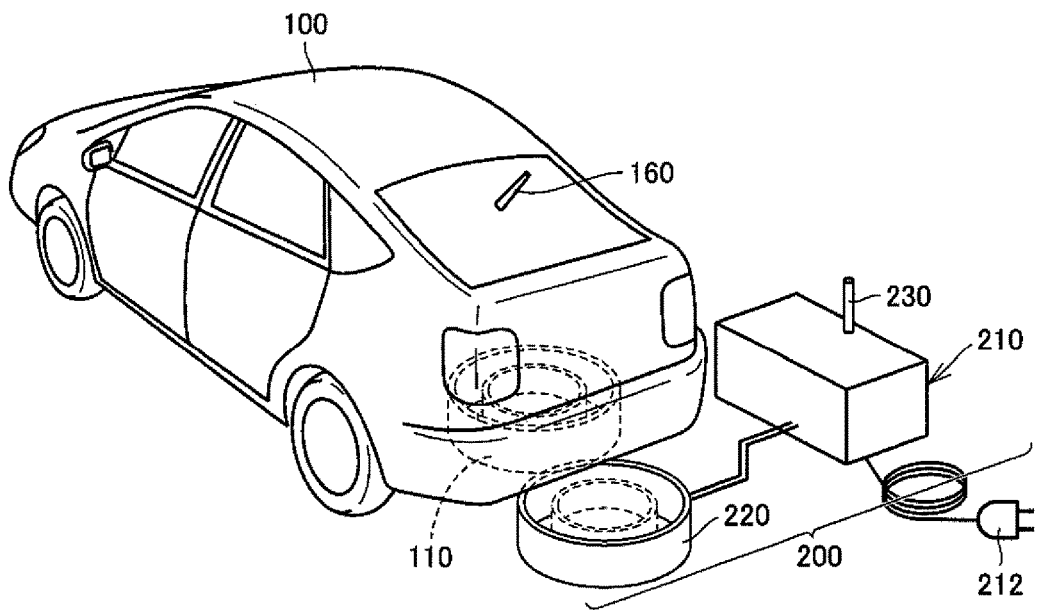
FIG. 1 is an overall configuration diagram of a power feed system for a vehicle according to an embodiment of this invention.

An embodiment of the present invention will be described hereinafter in detail with reference to the drawings. In the drawings, the same or corresponding elements have the same reference characters allotted and description thereof will not be repeated.

FIG. 1 is an overall configuration diagram of an electric power transmission and reception system according to an embodiment of this invention.

Referring to FIG. 1, an electric power transmission and reception system 10 includes a vehicle 100 and an electric power transmission device 200. Vehicle 100 includes an electric power reception portion 110 and a communication portion 160.

Electric power reception portion 110 is installed on a bottom surface of a vehicle body and configured to receive in a non-contact manner, electric power sent from an electric power transmission portion 220 of electric power transmission device 200. Specifically, electric power reception portion 110 includes a self-resonance coil (also referred to as a resonant coil) which will be described later, and receives electric power from electric power transmission portion 220 in a non-contact manner, by resonation through electromagnetic field with a self-resonance coil included in electric power transmission portion 220. Communication portion 160 is a communication interface for communication between vehicle 100 and electric power transmission device 200.

Electric power transmission device 200 includes a high-frequency power supply device 210, electric power transmission portion 220, and a communication portion 230. High-frequency power supply device 210 converts commercial AC power supplied, for example, through a connector 212 into high-frequency electric power, and outputs the electric power to electric power transmission portion 220.

Electric power transmission portion 220 is installed, for example, on a floor surface of a parking lot, and configured to send in a non-contact manner, high-frequency electric power supplied from high-frequency power supply device 210 to electric power reception portion 110 of vehicle 100. Specifically, electric power transmission portion 220 includes a self-resonance coil and transmits electric power to electric power reception portion 110 in a non-contact manner as this self-resonance coil resonates through electromagnetic field with the self-resonance coil included in electric power reception portion 110. Communication portion 230 is a communication interface for communication between electric power transmission device 200 and vehicle 100.

Here, in power feed from electric power transmission device 200 to vehicle 100, vehicle 100 should be guided to electric power transmission device 200 for registration between electric power reception portion 110 of vehicle 100 and electric power transmission portion 220 of electric power transmission device 200. Namely, registration of vehicle 100 is not easy. A portable device can be carried with a user's hand and easily placed at an appropriate position of a power feed unit such as a charger. The vehicle, however, should be parked at an appropriate position through an operation of the vehicle by a user, and it is impossible to carry the vehicle with his/her hand for position adjustment.

Therefore, for power feed from electric power transmission device 200 to vehicle 100, a method high in tolerance for position displacement is desirably adopted. It has been said about the electromagnetic induction method that a transmission distance is short and tolerance for position displacement is also low. If an attempt to adopt the electromagnetic induction method for power feed to a vehicle is made, it is possible that highly accurate driver's driving technique is required at the time of parking, a highly accurate vehicle guide device should be mounted on a vehicle, or a movable portion for moving a coil position so as to cover a rough parking position is necessary.

It has been said about a resonant method based on electromagnetic field that relatively high electric power can be transmitted even when a transmission distance is several m and tolerance for position displacement is also generally higher than the electromagnetic induction method. Therefore, in electric power transmission and reception system 10 according to this embodiment, electric power is fed from electric power transmission device 200 to vehicle 100 by using a resonant method.

It is noted that, in the electric power transmission and reception system according to the present embodiment, a natural frequency of the electric power transmission portion and a natural frequency of the electric power reception portion are the same.

The "natural frequency of the electric power transmission portion" means an oscillation frequency in a case that an electric circuit including a coil and a capacitor of the electric power transmission portion freely oscillates. It is noted that the "resonance frequency of the electric power transmission portion" means a natural frequency at the time when braking force or electric resistance is set to zero in an electric circuit including a coil and a capacitor of the electric power transmission portion.

Similarly, the "natural frequency of the electric power reception portion" means an oscillation frequency in a case that an electric circuit including a coil and a capacitor of the electric power reception portion freely oscillates. It is noted that the "resonance frequency of the electric power reception portion" means a natural frequency at the time when braking force or electric resistance is set to zero in an electric circuit including a coil and a capacitor of the electric power reception portion.

The "same natural frequency" herein means not only a case that the natural frequencies are exactly the same but also natural frequencies are substantially the same. "Substantially the same natural frequency" means that a difference between a natural frequency of the electric power transmission portion and a natural frequency of the electric power reception portion is within 10% of the natural frequency of the electric power transmission portion or the natural frequency of the electric power reception portion.

Figure 2:
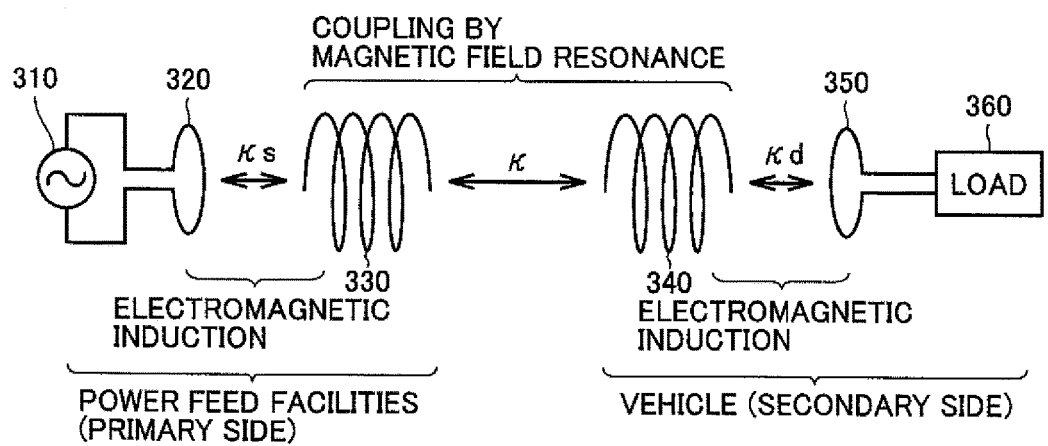
FIG. 2 is a diagram for illustrating principles of electric power transmission using a resonant method.

FIG. 2 is a diagram for illustrating principles of electric power transmission using a resonant method.

Referring to FIG. 2, according to this resonant method, two LC resonance coils having the same natural frequency resonate in electromagnetic field (near field) as in resonance of two tuning forks, so that electric power is transmitted from one coil to the other coil through electromagnetic field.

Specifically, a primary coil 320 is connected to a high-frequency power supply 310 and high-frequency electric power is fed to a primary self-resonance coil 330 magnetically coupled to primary coil 320 through electromagnetic induction. Primary self-resonance coil 330 is an LC resonator with inductance and floating capacitance of the coil itself and resonates with a secondary self-resonance coil 340, which is the same in resonance frequency as primary self-resonance coil 330, through electromagnetic field (near field). Then, energy (electric power) moves from primary self-resonance coil 330 to secondary self-resonance coil 340 through electromagnetic field. Energy (electric power) that moved to secondary self-resonance coil 340 is extracted by a secondary coil 350 magnetically coupled to secondary self-resonance coil 340 through electromagnetic induction and supplied to a load 360. It is noted that electric power transmission with the resonant method is realized when a Q value indicating intensity of resonance between primary self-resonance coil 330 and secondary self-resonance coil 340 is greater, for example, than 100.

In addition, in the electric power transmission and reception system according to the present embodiment, by causing the electric power transmission portion and the electric power reception portion to resonate through electromagnetic field, electric power is transmitted from the electric power transmission portion to the electric power reception portion, and a coefficient of coupling (κ) between the electric power transmission portion and the electric power reception portion is not greater than 0.1. It is noted that, in electric power transmission generally making use of electromagnetic induction, a coefficient of coupling (κ) between the electric power transmission portion and the electric power reception portion is close to 1.0.

It is noted that, with regard to correspondence with FIG. 1, secondary self-resonance coil 340 and secondary coil 350 correspond to electric power reception portion 110 in FIG. 1 and primary coil 320 and primary self-resonance coil 330 correspond to electric power transmission portion 220 in FIG. 1.

Figure 3:
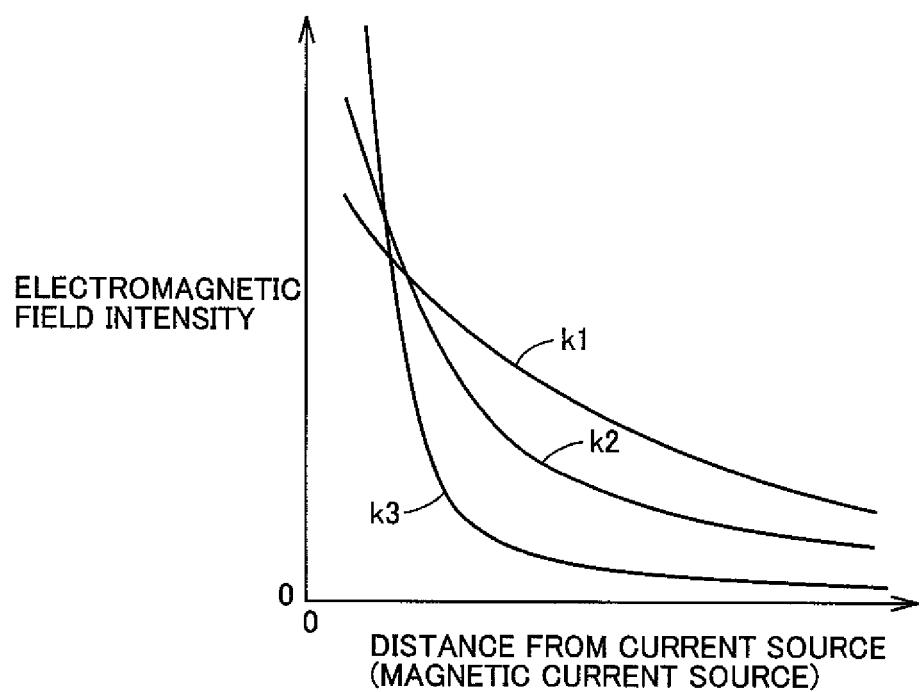
FIG. 3 is a diagram showing relation between a distance from a current source (magnetic current source) and electromagnetic field intensity.

FIG. 3 is a diagram showing relation between a distance from a current source (magnetic current source) and electromagnetic field intensity.

Referring to FIG. 3, electromagnetic field includes three components. A curve k1 represents a component inversely proportional to a distance from a wave source and it is referred to as a "radiation electromagnetic field." A curve k2 represents a component inversely proportional to a square of a distance from a wave source and it is referred to as an "induction electromagnetic field." In addition, a curve k3 represents a component inversely proportional to a cube of a distance from a wave source and it is referred to as a "static electromagnetic field."

Here, there is an area where intensity of electromagnetic waves sharply decreases with a distance from the wave source. According to the resonant method, however, energy (electric power) is transmitted by making use of this near field (evanescent field). Namely, a pair of resonators (for example, a pair of LC resonance coils) having the same natural frequency is caused to resonate by making use of the near field, so that energy (electric power) is transmitted from one resonator (primary self-resonance coil) to the other resonator (secondary self-resonance coil). Since this near field does not propagate energy (electric power) over a long distance, the resonant method can achieve electric power transmission with less energy loss than electromagnetic waves transmitting energy (electric power) by means of the "radiation electromagnetic field" propagating energy over a long distance.

Figure 4:
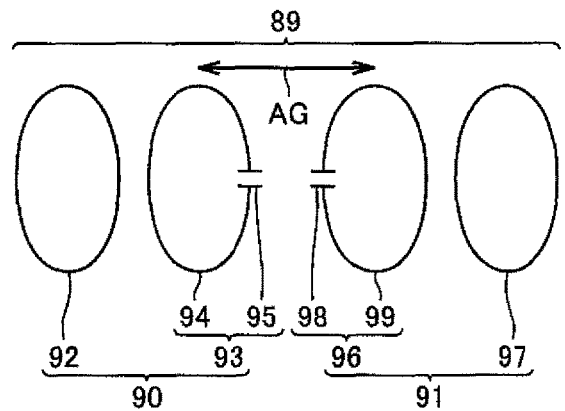
FIG. 4 is a diagram showing a simulation model of an electric power transmission system.
Figure 5:
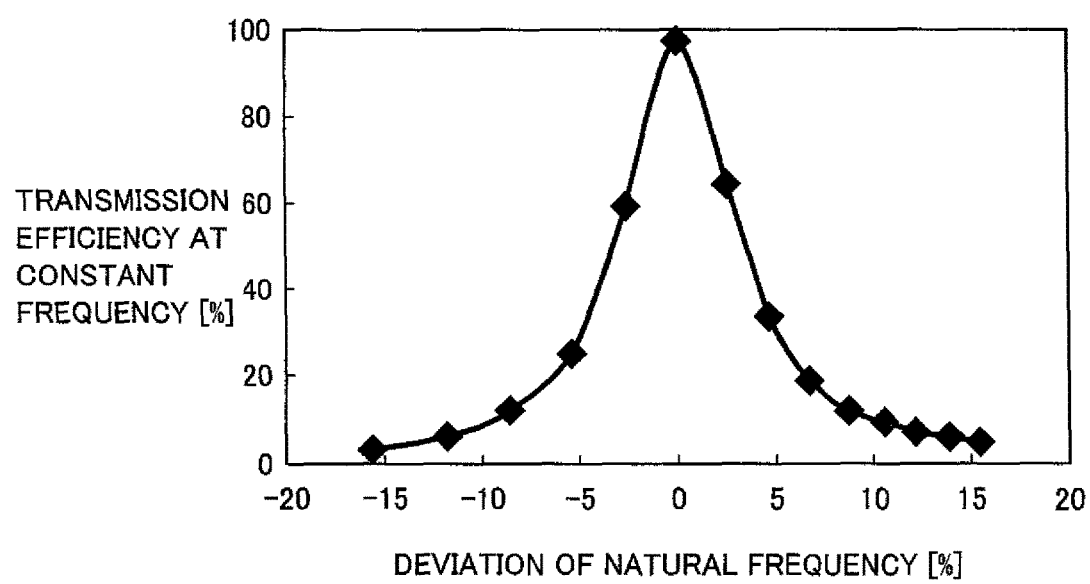
FIG. 5 is a diagram showing relation between efficiency and deviation in natural frequency between an electric power transmission device and an electric power reception device.

Simulation results of analysis of relation between a difference in natural frequency and electric power transmission efficiency will be described with reference to FIGS. 4 and 5. FIG. 4 is a diagram showing a simulation model of an electric power transmission system. In addition, FIG. 5 is a diagram showing relation between electric power transmission efficiency and deviation in natural frequency between an electric power transmission device and an electric power reception device.

Referring to FIG. 4, an electric power transmission system 89 includes an electric power transmission portion 90 and an electric power reception portion 91. Electric power transmission portion 90 includes a first coil 92 and a second coil 93. Second coil 93 includes a resonance coil 94 and a capacitor 95 connected to resonance coil 94. Electric power reception portion 91 includes a third coil 96 and a fourth coil 97. Third coil 96 includes a resonance coil 99 and a capacitor 98 connected to this resonance coil 99.

Inductance of resonance coil 94 is denoted as inductance Lt and capacitance of capacitor 95 is denoted as capacitance C1. Inductance of resonance coil 99 is denoted as inductance Lr and capacitance of capacitor 98 is denoted as capacitance C2. With setting of each parameter as such, a natural frequency f1 of second coil 93 is expressed in an equation (1) below and a natural frequency f2 of third coil 96 is expressed in an equation (2) below.

$$f1 = 1/\{2\pi(Lt \times C1)^{1/2}\} \quad (1)$$

$$f2 = 1/\{2\pi(Lr \times C2)^{1/2}\} \quad (2)$$

Here, relation between deviation in natural frequency between second coil 93 and third coil 96 and electric power transmission efficiency in a case that inductance Lr and capacitances C1, C2 are fixed and only inductance Lt is varied is shown in FIG. 5. It is noted that, in this simulation, relative positional relation between resonance coil 94 and resonance coil 99 is fixed and in addition, a frequency of a current supplied to second coil 93 is constant.

In the graph shown in FIG. 5, the abscissa represents deviation (%) in natural frequency and the ordinate represents electric power transmission efficiency (%) at a constant frequency. Deviation (%) in natural frequency is expressed in an equation (3) below.

$$(\text{Deviation in Natural Frequency})=\{(f1-f2)/f2\}\times 100 \ (\%) \quad (3)$$

As is clear also from FIG. 5, when deviation (%) in natural frequency is 0%, electric power transmission efficiency is almost 100%. When deviation (%) in natural frequency is ±5%, electric power transmission efficiency is approximately 40%. When deviation (%) in natural frequency is ±10%, electric power transmission efficiency is approximately 10%. When deviation (%) in natural frequency is ±15%, electric power transmission efficiency is approximately 5%. Namely, it can be seen that electric power transmission efficiency can be enhanced to a practical level by setting natural frequencies of second coil 93 and third coil 96 such that an absolute value of deviation (%) in natural frequency (difference in natural frequency) is not greater than 10% of the natural frequency of third coil 96. In addition, electric power transmission efficiency can further be enhanced by setting natural frequencies of second coil 93 and third coil 96 such that an absolute value of deviation (%) in natural frequency is not higher than 5% of the natural frequency of third coil 96, which is further preferred. It is noted that electromagnetic field analysis software (JMAG (trademark): manufactured by JSOL Corporation)) is adopted as simulation software.

Figure 6:
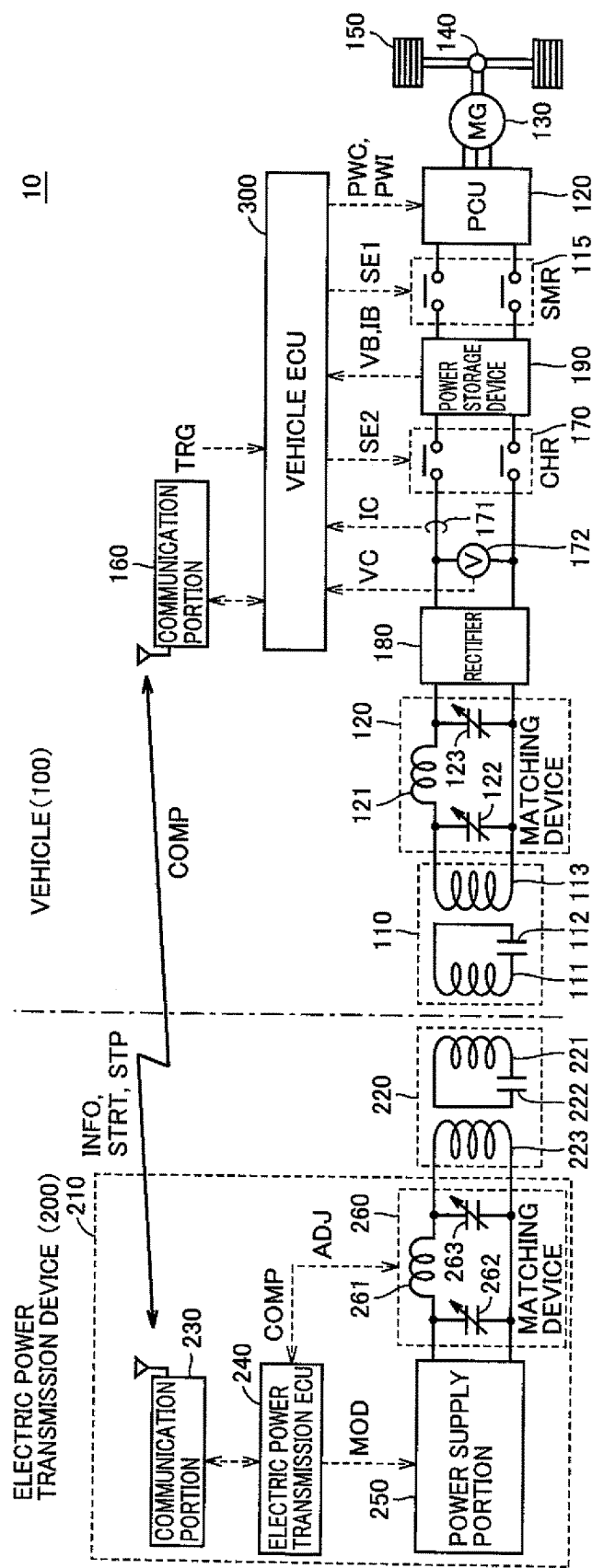
FIG. 6 is a detailed configuration diagram of an electric power transmission and reception system 10 shown in FIG. 1.

FIG. 6 is a detailed configuration diagram of electric power transmission and reception system 10 shown in FIG. 1. Referring to FIG. 6, vehicle 100 includes, in addition to electric power reception portion 110 and communication portion 160, a matching device 120, a rectifier 180, a charge relay (CHR) 170, a power storage device 190, a system main relay (SMR) 115, a power control unit PCU 120, a motor generator 130, a motive power transmission gear 140, a drive wheel 150, a vehicle ECU (Electronic Control Unit) 300 representing a control device, a current sensor 171, and a voltage sensor 172. Electric power reception portion 110 includes a secondary self-resonance coil 111, a capacitor 112, and a secondary coil 113.

Though an electric car is described as vehicle 100 by way of example in the present embodiment, a configuration of vehicle 100 is not limited thereto so long as a vehicle can run with electric power stored in a power storage device. Other examples of vehicle 100 include a hybrid vehicle incorporating an engine, a fuel cell car incorporating a fuel cell, and the like.

Secondary self-resonance coil 111 receives electric power through electromagnetic field by means of electromagnetic resonance from a primary self-resonance coil 221 included in electric power transmission device 200.

The number of turns of this secondary self-resonance coil 111 and a distance between coils are set as appropriate based on a distance from primary self-resonance coil 221 of electric power transmission device 200, resonant frequencies of primary self-resonance coil 221 and secondary self-resonance coil 111, and the like, such that a Q value indicating intensity of resonance between primary self-resonance coil 221 and secondary self-resonance coil 111 is greater (for example, Q>100) and a coefficient of coupling (κ) indicating a degree of coupling thereof or the like is small (for example, not greater than 0.1).

Capacitor 112 is connected to opposing ends of secondary self-resonance coil 111 and forms an LC resonance circuit together with secondary self-resonance coil 111. Capacitance of capacitor 112 is set as appropriate to achieve a prescribed resonant frequency in accordance with inductance of secondary self-resonance coil 111. It is noted that, in a case that a desired resonance frequency is obtained with floating capacitance of secondary self-resonance coil 111 itself, no capacitor 112 may be provided.

Secondary coil 113 is provided coaxially with secondary self-resonance coil 111 and it can magnetically couple to secondary self-resonance coil 111 through electromagnetic induction. This secondary coil 113 extracts electric power received by secondary self-resonance coil 111 through electromagnetic induction and outputs electric power to rectifier 180 via matching device 120.

Matching device 120 includes a coil 121 and variable capacitors 122, 123. It is noted that matching device 120 can adjust impedance of the electric power reception device by adjusting variable capacitors 122, 123. When variable capacitors 122, 123 are set to a prescribed state, impedance of the electric power reception device can be set also as impedance in a state without matching device 120, that is, a case that matching device 120 is not inserted.

Rectifier 180 rectifies AC power received from secondary coil 113 and outputs rectified DC power to power storage device 190 through CHR 170. Rectifier 180 can be configured, for example, to include a diode bridge and a smoothing capacitor (neither of which is shown). Though what is called a switching regulator which carries out rectification based on switching control can also be employed as rectifier 180, rectifier 180 may also be included in electric power reception portion 110, and in order to prevent malfunction or the like of a switching element involved with generated electromagnetic field, a static rectifier such as a diode bridge is more preferably adopted.

Though the present embodiment is configured such that DC power rectified by rectifier 180 is directly output to power storage device 190, if a rectified DC voltage is different from a charging voltage which can be tolerated by power storage device 190, a DC/DC converter (not shown) for voltage conversion may be provided between rectifier 180 and power storage device 190.

Voltage sensor 172 is provided between a power line pair connecting rectifier 180 and power storage device 190 to each other. Voltage sensor 172 detects a DC voltage on a secondary side of rectifier 180, that is, a power reception voltage received from electric power transmission device 200, and outputs a detection value VC to vehicle ECU 300.

Current sensor 171 is provided in a power line connecting rectifier 180 and power storage device 190 to each other. Current sensor 171 detects a charging current for power storage device 190 and outputs a detection value IC to vehicle ECU 300.

CHR 170 is electrically connected to rectifier 180 and power storage device 190. CHR 170 is controlled by a control signal SE2 from vehicle ECU 300 and switches between supply and cut-off of electric power from rectifier 180 to power storage device 190.

Power storage device 190 is an electric power storage element configured to be chargeable and dischargeable. Power storage device 190 is implemented, for example, by such a secondary battery as a lithium ion battery, a nickel metal hydride battery, or a lead acid battery, or a power storage element such as an electric double layer capacitor.

Power storage device 190 is connected to rectifier 180 with CHR 170 being interposed. Power storage device 190 stores electric power received by electric power reception portion 110 and rectified by rectifier 180. In addition, power storage device 190 is connected also to PCU 120 with SMR 115 being interposed. Power storage device 190 supplies electric power for generating vehicle driving force to PCU 120. Moreover, power storage device 190 stores electric power generated by motor generator 130. Output from power storage device 190 is, for example, around 200 V.

Power storage device 190 is provided with a voltage sensor and a current sensor for detecting a voltage VB and an input and output current IB of power storage device 190, although they are not shown. These detection values are output to vehicle ECU 300. Vehicle ECU 300 calculates a state of charge (also referred to as "SOC") of power storage device 190 based on these voltage VB and current IB.

SMR 115 is interposed in a power line connecting power storage device 190 and PCU 120 to each other. Then, SMR 115 is controlled by a control signal SE1 from vehicle ECU 300 and switches between supply and cut-off of electric power between power storage device 190 and PCU 120.

PCU 120 includes a converter and an inverter, although they are not shown. The converter converts a voltage from power storage device 190 under the control by a control signal PWC from vehicle ECU 300. The inverter drives motor generator 130 with the use of electric power converted by the converter, under the control by a control signal PWI from vehicle ECU 300.

Motor generator 130 is an AC rotating electric machine, and for example, it is a permanent magnet type synchronous motor including a rotor having a permanent magnet embedded.

Output torque of motor generator 130 is transmitted to drive wheel 150 through motive power transmission gear 140 to thereby run vehicle 100. Motor generator 130 can generate electric power with rotational force of drive wheel 150 during a regenerative braking operation of vehicle 100. Then, PCU 120 causes generated electric power to be converted to charging electric power for power storage device 190.

In a hybrid car incorporating an engine (not shown) in addition to motor generator 130, the engine and motor generator 130 are operated in coordination, so that necessary vehicle driving force is generated. In this case, power storage device 190 can be charged also with electric power generated through rotation of the engine.

As described above, communication portion 160 is a communication interface for wireless communication between vehicle 100 and electric power transmission device 200. Communication portion 160 outputs to electric power transmission device 200, battery information INFO including SOC of power storage device 190 from vehicle ECU 300. In addition, communication portion 160 outputs to electric power transmission device 200, signals STRT, STP indicating start and stop of electric power transmission from electric power transmission device 200.

Vehicle ECU 300 includes a CPU (Central Processing Unit), a storage device, and an input/output buffer, none of which is shown in FIG. 6, receives input of signals from each sensor and the like and outputs control signals to each device, and controls vehicle 100 and each device. It is noted that such control is not limited to processing by software and processing with dedicated hardware (electronic circuitry) can also be performed.

When vehicle ECU 300 receives a charge start signal TRG resulting from an operation or the like by a user, it outputs signal STRT indicating start of electric power transmission to electric power transmission device 200 through communication portion 160 based on a prescribed condition being satisfied. Alternatively, vehicle ECU 300 outputs signal STP indicating stop of electric power transmission to electric power transmission device 200 through communication portion 160, based on power storage device 190 being fully charged, an operation by a user, or the like.

Electric power transmission device 200 includes power supply device 210 and electric power transmission portion 220. Power supply device 210 further includes, in addition to communication portion 230, an electric power transmission ECU 240 representing a control device, a power supply portion 250, and a matching device 260. Furthermore, electric power transmission portion 220 includes primary self-resonance coil 221, a capacitor 222, and a primary coil 223.

Power supply portion 250 is controlled by a control signal MOD from electric power transmission ECU 240 and converts electric power received from an AC power supply such as a commercial power supply to high-frequency electric power. Then, power supply portion 250 supplies resultant high-frequency electric power to primary coil 223 through matching device 260.

Matching device 260 is a circuit for matching impedance between electric power transmission device 200 and vehicle 100. Matching device 260 is configured to include an inductor 261 and variable capacitors 262, 263. Matching device 260 is controlled by a control signal ADJ provided from electric power transmission ECU 240 based on battery information INFO transmitted from vehicle 100, and the variable capacitor and a variable inductor are adjusted such that impedance of electric power transmission device 200 matches with impedance on a side of vehicle 100. In addition, matching device 260 outputs a signal COMP indicating completion of impedance adjustment to electric power transmission ECU 240.

Though matching device 260 is provided on an electric power transmission side and matching device 120 is provided on an electric power reception side in FIG. 6, a configuration may be such that a matching device is provided on only any one of the electric power transmission side and the electric power reception side.

Primary self-resonance coil 221 transfers electric power by means of electromagnetic resonance to secondary self-resonance coil 111 included in electric power reception portion 110 of vehicle 100.

The number of turns of this primary self-resonance coil 221 and a distance between coils are set as appropriate based on a distance from secondary self-resonance coil 111 of vehicle 100, resonant frequencies of primary self-resonance coil 221 and secondary self-resonance coil 111, and the like, such that a Q value indicating intensity of resonance between primary self-resonance coil 221 and secondary self-resonance coil 111 is greater (for example, Q>100) and K indicating a degree of coupling thereof or the like is small (for example, not greater than 0.1).

Capacitor 222 is connected to opposing ends of primary self-resonance coil 221 and forms an LC resonance circuit together with primary self-resonance coil 221. Capacitance of capacitor 222 is set as appropriate to achieve a prescribed resonant frequency in accordance with inductance of primary self-resonance coil 221. It is noted that, in a case that a desired resonance frequency is obtained with floating capacitance of primary self-resonance coil 221 itself, no capacitor 222 may be provided.

Primary coil 223 is provided coaxially with primary self-resonance coil 221 and it can magnetically couple to primary self-resonance coil 221 through electromagnetic induction. Primary coil 223 transmits high-frequency electric power supplied through matching device 260 to primary self-resonance coil 221 through electromagnetic induction.

As described above, communication portion 230 is a communication interface for wireless communication between electric power transmission device 200 and vehicle 100. Communication portion 230 receives battery information INFO transmitted from communication portion 160 on the side of vehicle 100 and signals STRT, STP indicating start and stop of electric power transmission, and outputs such information to electric power transmission ECU 240. In addition, communication portion 230 receives from electric power transmission ECU 240, signal COMP indicating completion of impedance adjustment from matching device 260, and outputs the signal to the side of vehicle 100.

Electric power transmission ECU 240 includes a CPU, a storage device, and an input/output buffer, none of which is shown in FIG. 6, receives input of signals from each sensor and the like and outputs control signals to each device, and controls each device in power supply device 210. It is noted that such control is not limited to processing by software and processing with dedicated hardware (electronic circuitry) can also be performed.

It is noted that, with regard to electric power transmission from electric power transmission device 200 to vehicle 100, relation in connection with electric power transmission portion 90 and electric power reception portion 91 described with reference to FIGS. 4 and 5 is satisfied. In the electric power transmission system in FIG. 6, a difference between a natural frequency of electric power transmission portion 220 and a natural frequency of electric power reception portion 110 is not more than ±10% of the natural frequency of electric power transmission portion 220 or the natural frequency of electric power reception portion 110. By thus setting the natural frequencies of electric power transmission portion 220 and electric power reception portion 110 in such a range, electric power transmission efficiency can be enhanced. On the other hand, when a difference in natural frequency above is higher than ±10%, electric power transmission efficiency is lower than 10% and such a disadvantage as a longer electric power transmission time period is caused.

It is noted that a natural frequency of electric power transmission portion 220 (electric power reception portion 110) means an oscillation frequency in a case that an electric circuit (a resonance circuit) implementing electric power transmission portion 220 (electric power reception portion 110) freely oscillates. It is noted that a natural frequency at the time when braking force or electric resistance is set to zero in an electric circuit (a resonance circuit) implementing electric power transmission portion 220 (electric power reception portion 110) is also referred to as a resonance frequency of electric power transmission portion 220 (electric power reception portion 110).

Electric power transmission portion 220 and electric power reception portion 110 supply and receive electric power in a non-contact manner through at least one of magnetic field formed between electric power transmission portion 220 and electric power reception portion 110 and oscillating at a specific frequency and electric field formed between electric power transmission portion 220 and electric power reception portion 110 and oscillating at a specific frequency. A coefficient of coupling K between electric power transmission portion 220 and electric power reception portion 110 is not greater than 0.1, and electric power is transmitted from electric power transmission portion 220 to electric power reception portion 110 by causing electric power transmission portion 220 and electric power reception portion 110 to resonate through electromagnetic field.

Figure 7:
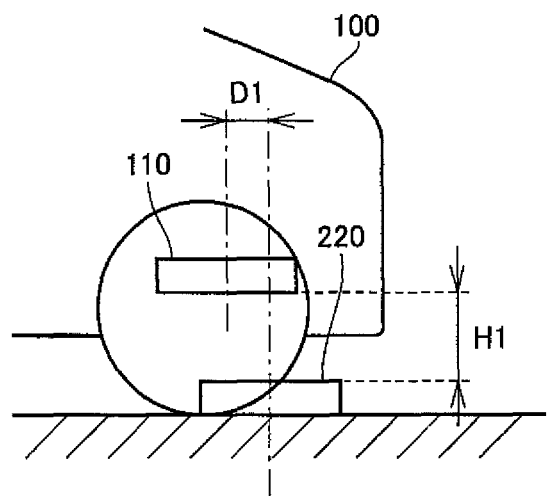
FIG. 7 is a diagram for illustrating position displacement between an electric power reception portion 110 and an electric power transmission portion 220.

FIG. 7 is a diagram for illustrating position displacement between electric power reception portion 110 and electric power transmission portion 220.

Referring to FIG. 7, a horizontal position displacement distance D1 between electric power reception portion 110 and electric power transmission portion 220 refers to a horizontal distance between a horizontal center of electric power reception portion 110 and a horizontal center of electric power transmission portion 220. If an electric power transmission portion or an electric power reception portion is designed on the premise that horizontal position displacement distance D1 is zero, lowering in efficiency is significant in a case that a horizontal position is displaced. In fact, parking with horizontal position displacement distance D1 not being zero is more likely than parking with horizontal position displacement distance D1 being zero.

In addition, a vertical distance H1 between electric power reception portion 110 and electric power transmission portion 220 also fluctuates depending on presence of a driver and/or a passenger, a load carrying capacity, an air pressure in a tire, or the like. Therefore, if vertical distance H1 is assumed to be fixed and an electric power transmission portion or an electric power reception portion is designed exactly in accordance with that fixed distance, lowering in efficiency is significant in a case that a vertical position is displaced.

Then, in the present embodiment, an electric power transmission portion or an electric power reception portion is designed on the premise that a position will be displaced.

Figure 8:
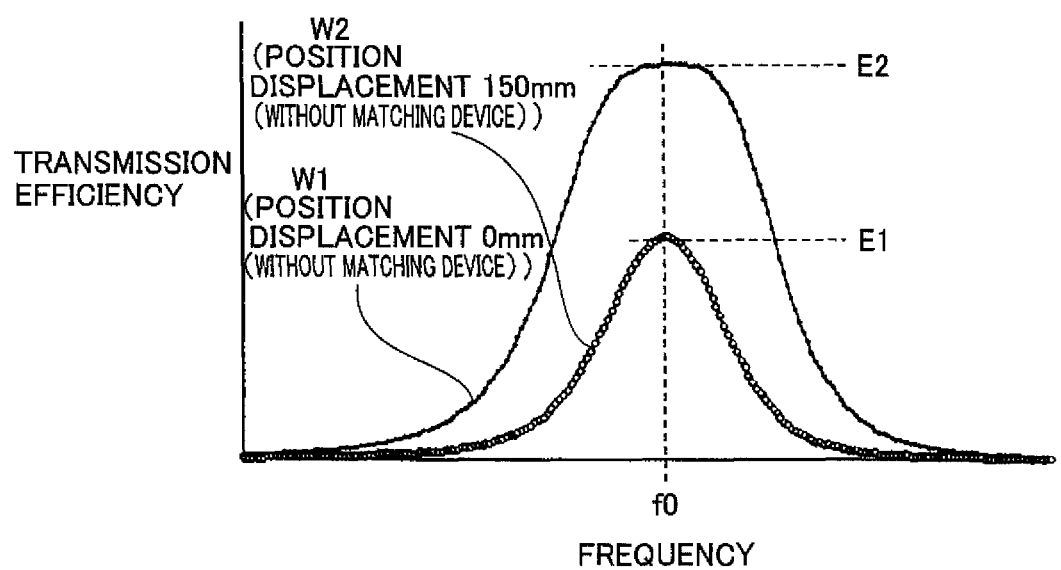
FIG. 8 is a diagram for illustrating characteristics (during unmatch) of an electric power transmission portion or an electric power reception portion in a comparative example with respect to the embodiment.

FIG. 8 is a diagram for illustrating characteristics (during unmatch) of an electric power transmission portion or an electric power reception portion in a comparative example with respect to the embodiment.

Figure 9:
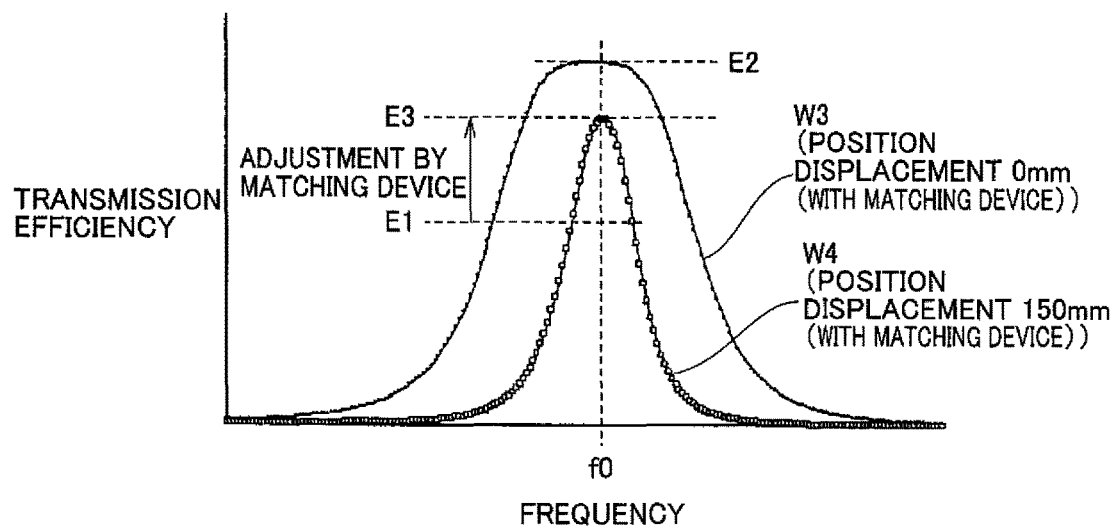
FIG. 9 is a diagram for illustrating characteristics (during match) of the electric power transmission portion or the electric power reception portion in the comparative example with respect to the embodiment.

FIG. 9 is a diagram for illustrating characteristics (during match) of the electric power transmission portion or the electric power reception portion in the comparative example with respect to the embodiment.

Referring to FIGS. 8 and 9, a resonant coil in a resonant type non-contact electric power transmission and reception system in the comparative example is designed such that a transmission efficiency peak matches with a power supply frequency f0 in a face-to-face state without position displacement, in order to maximize efficiency of transmission between the electric power transmission portion and the electric power reception portion, and there is a single peak frequency.

In FIG. 8, as compared with a characteristic curve W1 in a state of position displacement of 0 mm (no position displacement), in a characteristic curve W2 in a state of position displacement of 150 mm, transmission efficiency at power supply frequency f0 lowers from E2 to E1.

Then, when impedance is matched by a matching device as shown in FIG. 9, characteristic curve W2 of position displacement of 150 mm varies to a characteristic curve W4, and transmission efficiency at power supply frequency g1 is improved from E1 to E3. Even after improvement, however, improvement up to match with transmission efficiency E2 in a state of no position displacement is not achieved, and a transmission efficiency guaranteed value in a case that position displacement up to plus or minus 150 mm is tolerated is transmission efficiency E3 at the maximum.

Figure 10:
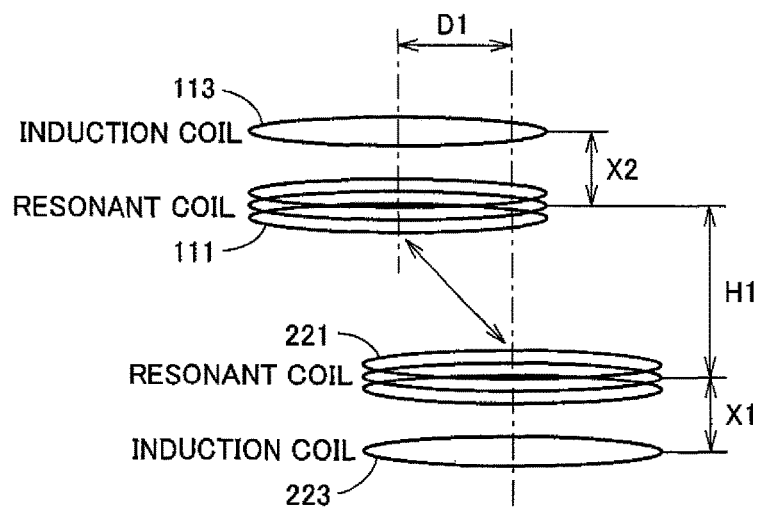
FIG. 10 is a diagram for illustrating characteristics and positional relation between coils in the electric power reception portion or the electric power transmission portion.

FIG. 10 is a diagram for illustrating characteristics and positional relation between coils in the electric power reception portion or the electric power transmission portion. It is noted that, for facilitating correspondence with FIG. 7, FIG. 10 also shows horizontal position displacement distance D1 and vertical distance H1.

Referring to FIG. 10, the electric power transmission portion is configured to include a resonant coil (primary self-resonance coil 221) and an induction coil (primary coil 223). The electric power reception portion is configured to include a resonant coil (secondary self-resonance coil 111) and an induction coil (secondary coil 113).

If an electric power transmission portion or an electric power reception portion is designed such that a distance X1 between the resonant coil (primary self-resonance coil 221) and the induction coil (primary coil 223) or a distance X2 between the resonant coil (secondary self-resonance coil 111) and the induction coil (secondary coil 113) increases, the electric power transmission portion and the electric power reception portion will be in close coupling and transmission efficiency will exhibit two peaks. Alternatively, when distance D is greater, coupling between the electric power transmission portion and the electric power reception portion shifts to loose coupling, and hence distance X1 between the resonant coil (primary self-resonance coil 221) and the induction coil (primary coil 223) or distance X2 between the resonant coil (secondary self-resonance coil 111) and the induction coil (secondary coil 113) is increased for adjustment.

Thus, it is important for a manufacturer to design an electric power transmission portion and an electric power reception portion, that is, to determine how long distance D should be set to achieve an optimal degree of coupling between the electric power transmission portion and the electric power reception portion.

Figure 11:
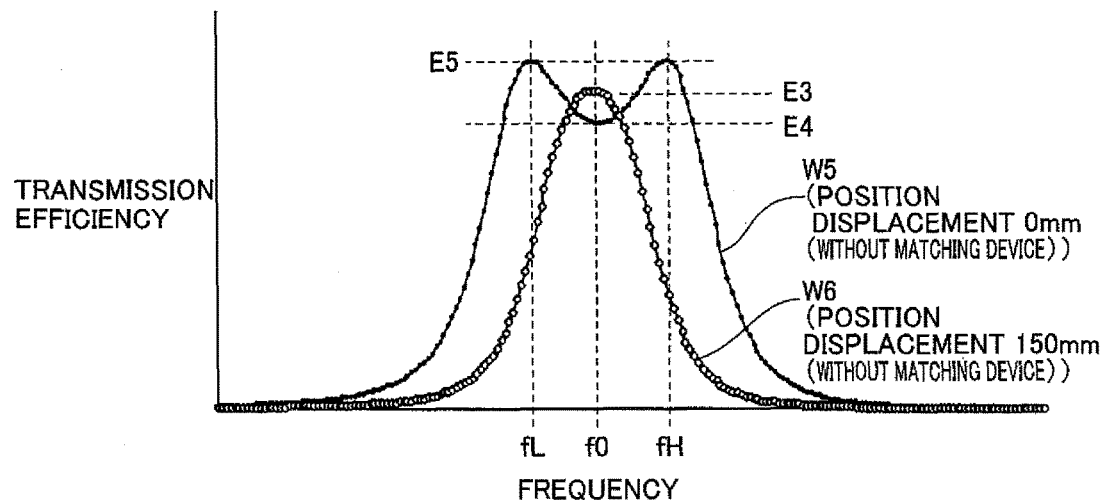
FIG. 11 is a diagram for illustrating characteristics (during unmatch) of the electric power transmission portion or the electric power reception portion in the present embodiment.

FIG. 11 is a diagram for illustrating characteristics (during unmatch) of the electric power transmission portion or the electric power reception portion in the present embodiment.

Figure 12:
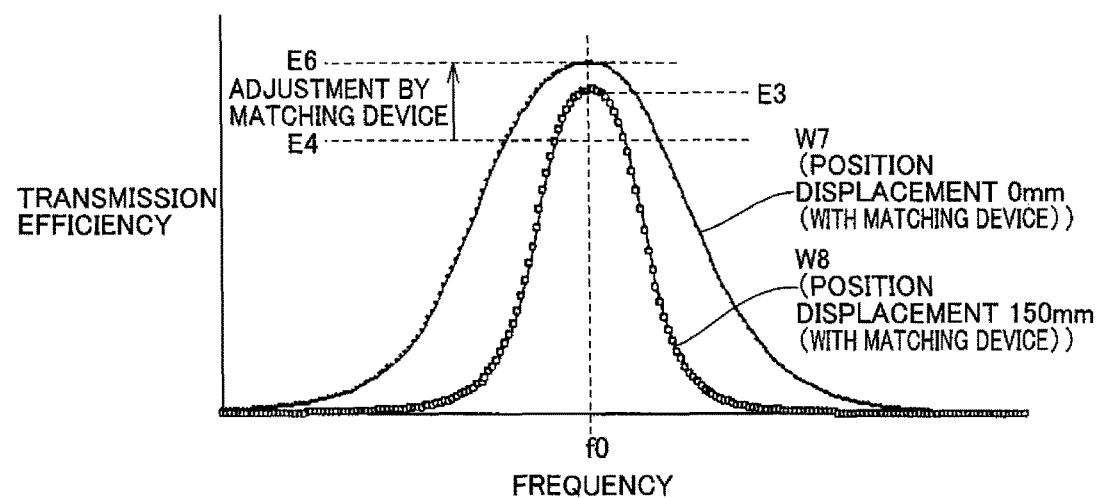
FIG. 12 is a diagram for illustrating characteristics (during match) of the electric power transmission portion or the electric power reception portion in the present embodiment.

FIG. 12 is a diagram for illustrating characteristics (during match) of the electric power transmission portion or the electric power reception portion in the present embodiment.

Referring to FIGS. 11 and 12, since a resonant coil in a resonant type non-contact electric power transmission and reception system in present embodiment maximizes efficiency of transmission between the electric power transmission portion and the electric power reception portion on the premise that a position will be displaced, the resonant coil is designed such that a transmission efficiency peak matches with power supply frequency f0 in a state of facing with a position displacement of 150 mm, and there is a single peak frequency as shown with a characteristic curve W6.

In FIG. 11, as compared with characteristic curve W6 in the state of position displacement of 150 mm, in a characteristic curve W5 in a state of position displacement of 0 mm (no position displacement), transmission efficiency at power supply frequency f0 is lowered from E3 to E4. Characteristic curve W5 has peaks at which transmission efficiency attains to E5 higher than E4, at two frequencies of a frequency fL lower than power supply frequency f0 and a frequency fH higher than power supply frequency f0.

When impedance is matched by a matching device in the electric power transmission portion or the electric power reception portion designed as such as shown in FIG. 12, characteristic curve W5 of position displacement of 0 mm varies to a characteristic curve W7, and transmission efficiency at power supply frequency f0 improves from E4 to E6.

If distance X1 or X2 between coils shown in FIG. 10 is set to achieve transmission efficiency guaranteed value E3 at a position of position displacement of 150 mm, transmission efficiency can be higher than E3 by matching of impedance with the use of a matching device while position displacement is smaller than 150 mm. In addition, regarding vertical distance H1 shown in FIG. 7, with a case of absence of a driver/passenger being defined as the reference (vertical distance H1 being great), distance X1 or X2 between coils should be set such that one maximum peak appears and that frequency matches with a power supply frequency.

Even though the same coil is used for an induction coil and a resonant coil in the present embodiment, distance X1, X2 between coils shown in FIG. 10 is adjusted to make up an electric power transmission portion or an electric power reception portion in a case of position displacement of 150 mm, so that transmission efficiency could be improved by several % as compared with the comparative example in FIGS. 8 and 9.

By designing an electric power transmission portion and an electric power reception portion as above, a non-contact electric power reception device, a non-contact electric power transmission device, and a non-contact electric power transmission and reception system for which a large amount of tolerable position displacement of an electric power transmission portion or an electric power reception portion (for example, approximately up to ½ of a coil diameter) is set can be realized.

In the electric power transmission and reception system according to the present embodiment as above, by causing the electric power transmission portion and the electric power reception portion to resonate through electromagnetic field, electric power is transmitted from the electric power transmission portion to the electric power reception portion. Coupling between the electric power transmission portion and the electric power reception portion in such electric power transmission is referred to, for example, as "magnetic resonant coupling," "magnetic field resonant coupling," "electromagnetic field resonance coupling," or "electric field resonance coupling."

"Electromagnetic resonance coupling" means coupling including any of "magnetic resonant coupling," "magnetic field resonant coupling," and "electric field resonance coupling."

Since an antenna in a coil shape is adopted for the electric power transmission portion and the electric power reception portion described herein, the electric power transmission portion and the electric power reception portion are coupled to each other mainly through magnetic field, and the electric power transmission portion and the electric power reception portion are in "magnetic resonant coupling" or "magnetic field resonant coupling."

It is noted that, for example, an antenna such as a meandering line can also be adopted for the electric power transmission portion and the electric power reception portion, and in this case, the electric power transmission portion and the electric power reception portion are coupled to each other mainly through electric field. Here, the electric power transmission portion and the electric power reception portion are in "electric field resonance coupling."

Though the electric power transmission portion and the electric power reception portion including an electromagnetic induction coil have been exemplified in the present embodiment, the present invention is applicable also to a resonant type non-contact electric power transmission and reception device including no electromagnetic induction coil. Namely, design of the electric power transmission portion and the electric power reception portion on the premise that a position will be displaced for achieving best efficiency while position displacement between the electric power transmission portion and the electric power reception portion is caused is applicable also to a resonant type non-contact electric power transmission and reception device including no electromagnetic induction coil or to a non-contact electric power transmission and reception device transmitting and receiving electric power with another method, without limited to the resonant type.

Though position displacement has been described by mainly exemplifying displacement in a horizontal direction in FIG. 7 or 10, it is intended to consider also displacement in a direction other than the horizontal direction.

Figure 13:
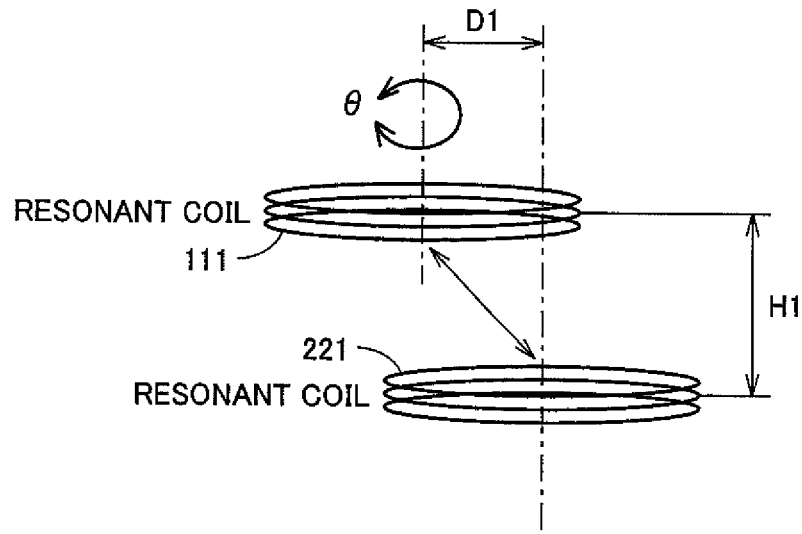
FIG. 13 is a diagram showing a first arrangement example of a resonant coil for illustrating position displacement.

FIG. 13 is a diagram showing a first arrangement example of a resonant coil for illustrating position displacement. As shown in FIG. 13, arrangement relation between resonant coil 111 and resonant coil 221 is defined by a horizontal displacement amount D1, a height H1, and an angle of rotation θ. Though influence by angle of rotation θ is not great in a case that a coil has an annular shape, influence by angle of rotation θ on transmission efficiency is great also in a case of a coil in a different shape (such as a quadrangle and a polygon).

Figure 14:
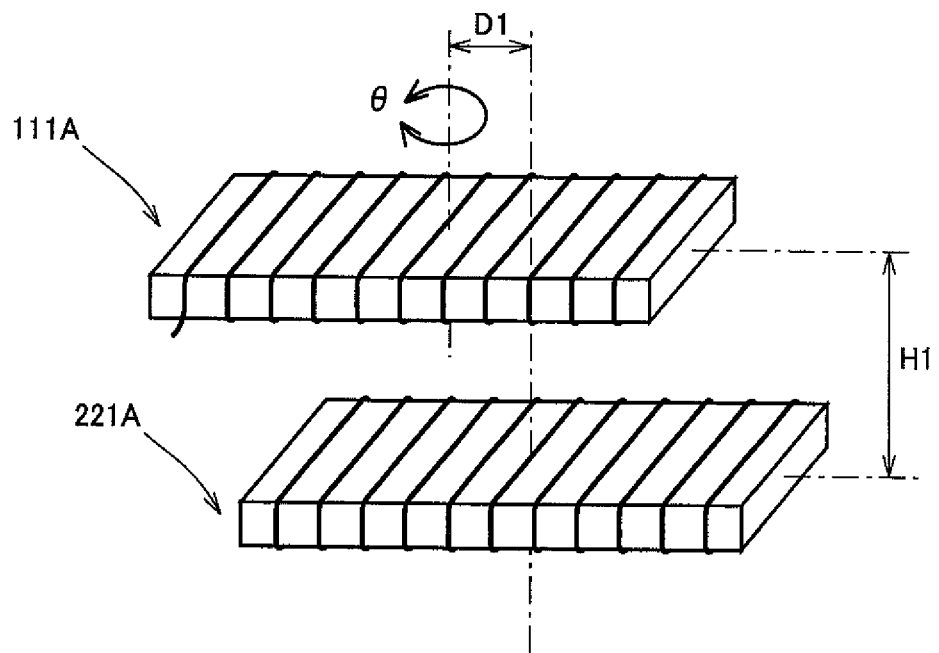
FIG. 14 is a diagram showing a second arrangement example of a resonant coil for illustrating position displacement.

FIG. 14 is a diagram showing a second arrangement example of a resonant coil for illustrating position displacement. FIG. 14 exemplifies a resonant coil 111A and a resonant coil 221A obtained by winding a wire around a flat-plate-shaped core material as the electric power transmission portion and the electric power reception portion.

As shown in FIG. 14, arrangement relation between resonant coil 111A and resonant coil 221A is defined by horizontal displacement amount D1, height H1, and angle of rotation θ.

Referring to FIGS. 13 and 14, position displacement may be other than displacement D1 in the horizontal direction. Position displacement herein includes the following displacement:

(i) Position displacement in a horizontal direction (referred to as displacement in an X direction);

(ii) Displacement in a height direction (referred to as displacement in an H direction);

(iii) Displacement by angle of rotation θ with respect to a central axis (referred to as displacement in a rotation direction);

(iv) A state that electric power reception efficiency lowers due to deviation in positional relation between the electric power transmission portion and the electric power reception portion in at least any one of the X direction, the H direction, and the rotation direction as compared with an optimal position, with a state that the electric power transmission portion and the electric power reception portion are arranged in a state capable of maintaining prescribed electric power reception efficiency being defined as the optimal position in the case of using a coil in a different shape for the electric power transmission portion/the electric power reception portion; and (v) A state that positional relation between a magnetic pole of the electric power transmission portion and a magnetic pole of the electric power reception portion is deviated in at least any one of the X direction, the H direction, and the rotation direction as compared with the optimal position above.

In particular in the case of the resonant coil as shown in FIG. 14, deviation in positional relation between the electric power transmission portion and the electric power reception portion in at least any one of the X direction, the H direction, and the rotation direction from a state that a position of the resonant coil has been arranged in the optimal state can be called position displacement.

Finally, referring again to the drawings, the present embodiment will be summarized. Referring to FIG. 6, the non-contact electric power reception device disclosed in the present embodiment is a non-contact electric power reception device for receiving in a non-contact manner, electric power transferred from electric power transmission device 200. Electric power transmission device 200 includes electric power transmission portion 220 and power supply portion 250 supplying AC power to electric power transmission portion 220. The non-contact electric power reception device includes electric power reception portion 110 receiving electric power from the electric power transmission portion in a non-contact manner and an electric load device (power storage device 190, PCU 120) using electric power received by electric power reception portion 110. Electric power reception portion 110 is configured to achieve best transmission efficiency (E3 in FIG. 11) at power supply frequency f0 of power supply portion 250 used for non-contact electric power transmission when the electric power reception portion is arranged with positions in a horizontal direction of the central axis of electric power reception portion 110 and the central axis of electric power transmission portion 220 being displaced from each other. Namely, electric power reception portion 110 is designed with a state of arrangement at a displaced position being defined as the reference.

It is noted that, in FIG. 11, electric power reception portion 110 is configured such that transmission efficiency (E3 in FIG. 11) at power supply frequency M in a case that electric power reception portion 110 is arranged at a position displaced from a target position with respect to electric power transmission portion 220 is higher than transmission efficiency (E4 in FIG. 11) at power supply frequency M of power supply portion 250 used for non-contact electric power transmission in a case that electric power reception portion 110 is arranged at the target position with respect to electric power transmission portion 220.

Preferably, the target position is a position where electric power reception portion 110 is arranged without position displacement from electric power transmission portion 220. Electric power reception portion 110 is configured such that power supply frequency f0 matches with a peak frequency at which transmission efficiency exhibits a peak in a case of change in frequency when an amount of position displacement from electric power transmission portion 220 is set to a prescribed amount (for example, 150 mm in FIG. 11).

More preferably, electric power reception portion 110 is configured to have peaks (E5 in FIG. 11) at which transmission efficiency is higher than transmission efficiency at power supply frequency f0, at at least two locations of a first frequency (fH in FIG. 11) higher than the power supply frequency and a second frequency (fL in FIG. 11) lower than the power supply frequency, when the electric power reception portion is arranged at the target position with respect to electric power transmission portion 220.

Further preferably, the non-contact electric power reception device further includes matching device 120 provided between electric power reception portion 110 and the electric load device (power storage device 190, PCU 120), for adjusting impedance of the non-contact electric power reception device. Electric power reception portion 110 has peaks at which transmission efficiency is higher than transmission efficiency E4 at power supply frequency f0, at at least two locations of a first frequency MI in FIG. 11) higher than the power supply frequency and a second frequency (fL in FIG. 11) lower than the power supply frequency, when the electric power reception portion is arranged at the target position with respect to electric power transmission portion 220 and the matching device is adjusted to a state electrically the same as a state without matching device (FIG. 11).

Further preferably, the non-contact electric power reception device further includes a control device (vehicle ECU 300) causing matching device 120 to adjust impedance of the non-contact electric power reception device when a position displacement amount is different from a prescribed amount (for example, 150 mm in FIGS. 11 and 12).

Further preferably, as shown in FIGS. 11 and 12, the control device (vehicle ECU 300) causes matching device 120 to adjust impedance of the non-contact electric power reception device even when a position displacement amount is substantially zero.

Preferably, electric power reception portion 110 is configured such that a difference in natural frequency from electric power transmission portion 220 is within ±10%.

More preferably, a coefficient of coupling between electric power reception portion 110 and electric power transmission portion 220 is not greater than 0.1.

More preferably, electric power transmission portion 220 transmits electric power to electric power reception portion 110 through at least one of magnetic field formed between electric power reception portion 110 and electric power transmission portion 220 and oscillating at a specific frequency and electric field formed between electric power reception portion 110 and electric power transmission portion 220 and oscillating at a specific frequency.

Referring to FIG. 6, in another aspect, the present embodiment discloses a non-contact electric power transmission device for transmitting electric power to an electric power reception device in a non-contact manner. The electric power reception device (vehicle 100) includes electric power reception portion 110 and an electric load device (power storage device 190, PCU 120) receiving electric power from electric power reception portion 110. The non-contact electric power transmission device includes electric power transmission portion 220 transmitting electric power to electric power reception portion 110 in a non-contact manner and power supply portion 250 supplying AC power to electric power transmission portion 220. Electric power transmission portion 220 is configured to achieve best transmission efficiency E3 at power supply frequency f0 of power supply portion 250 used for non-contact electric power transmission when the electric power reception portion is arranged with positions in the horizontal direction of the central axis of electric power reception portion 110 and the central axis of electric power transmission portion 220 being displaced from each other.

Transmission efficiency E3 is better than transmission efficiency E4 at power supply frequency f0 of power supply portion 250 used for non-contact electric power transmission in a case that electric power transmission portion 220 is arranged at the target position with respect to electric power reception portion 110. Namely, the configuration is such that best transmission efficiency E3 is achieved at power supply frequency f0 in a case that electric power transmission portion 220 is arranged at a position displaced from the target position with respect to electric power reception portion 110 (position displacement of 150 mm in FIG. 11).

Preferably, the target position is a position where electric power transmission portion 220 is arranged without position displacement from electric power reception portion 110. Electric power transmission portion 220 is configured such that power supply frequency f0 matches with a peak frequency at which transmission efficiency exhibits a peak in a case of change in frequency when a position displacement amount with respect to electric power reception portion 110 is set to a prescribed amount (for example, 150 mm in FIG. 11).

More preferably, electric power transmission portion 220 is configured to have peaks (E5 in FIG. 11) at which transmission efficiency is higher than transmission efficiency (E4 in FIG. 11) at power supply frequency f0, at at least two locations of a first frequency (fH in FIG. 11) higher than the power supply frequency and a second frequency (fL in FIG. 11) lower than power supply frequency f0, when the electric power transmission portion is arranged at the target position with respect to electric power reception portion 110.

Further preferably, non-contact electric power transmission device 200 further includes matching device 260 provided between electric power transmission portion 220 and power supply portion 250, for adjusting impedance of non-contact electric power transmission device 200. Electric power transmission portion 220 has peaks (E5 in FIG. 11) at which transmission efficiency is higher than transmission efficiency (E4 in FIG. 11) at power supply frequency f0, at at least two locations of a first frequency (fH in FIG. 11) higher than power supply frequency f0 and a second frequency (fL in FIG. 11) lower than power supply frequency f0, when the electric power transmission portion is arranged at the target position with respect to electric power reception portion 110 and matching device 260 is adjusted to a state electrically the same as a state without a matching device.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

10 electric power transmission and reception system; 100, 300 ECU; 91, 110 electric power reception portion; 111, 340 secondary self-resonance coil; 112, 222 capacitor; 113, 350 secondary coil; 120, 260 matching device; 121 coil; 122, 123, 262, 263 variable capacitor; 130 motor generator; 140 motive power transmission gear; 150 drive wheel; 160, 230 communication portion; 171 current sensor; 172 voltage sensor; 180 rectifier; 190 power storage device; 200 electric power transmission device; 210 high-frequency power supply device; 212 connector; 90, 220 electric power transmission portion; 221, 330 primary self-resonance coil; 223, 320 primary coil; 250 power supply portion; 261 inductor; 310 high-frequency power supply; 360 load; and PCU power control unit.

The invention claimed is:

1. A non-contact electric power reception device for receiving in a non-contact manner, electric power transferred from an electric power transmission device, said electric power transmission device including an electric power transmission portion and a power supply portion for supplying AC power to said electric power transmission portion, comprising:
an electric power reception portion configured to receive electric power in a non-contact manner from said electric power transmission portion; and
an electric load device configured to use electric power received by said electric power reception portion,
said electric power reception portion including a resonant coil and an induction coil,
a distance between said resonant coil and said induction coil of said electric power reception portion being set to achieve higher transmission efficiency at a predetermined power supply frequency of said power supply portion used for non-contact electric power transmission when said electric power reception portion is arranged with its position being displaced by a predetermined distance from a position of said electric power transmission portion than in the case when said electric power reception portion and said electric power transmission portion are aligned, and
said electric power reception portion being configured such that when said electric power reception portion is arranged with positions in a horizontal direction of a central axis of said electric power reception portion and a central axis of said electric power transmission portion being displaced from each other, a peak frequency at which transmission efficiency as a function of electric power transmission frequency exhibits a peak and said predetermined power supply frequency match with each other.

2. The non-contact electric power reception device according to claim 1, wherein
said electric power reception portion is configured to have peaks at which transmission efficiency is higher than transmission efficiency at said power supply frequency, at least two locations of a first frequency higher than said power supply frequency and a second frequency lower than said power supply frequency, when said electric power reception portion is arranged with positions in the horizontal direction of the central axis of said electric power reception portion and the central axis of said electric power transmission portion matching with each other.

3. The non-contact electric power reception device according to claim 2, further comprising:
a matching device provided between said electric power reception portion and said electric load device, for adjusting impedance of said non-contact electric power reception device; and
a control device causing said matching device to adjust impedance of said non-contact electric power reception device when said electric power reception portion is arranged with positions in the horizontal direction of the central axis of said electric power reception portion and the central axis of said electric power transmission portion matching with each other.

4. The non-contact electric power reception device according to claim 2, further comprising:
a matching device provided between said electric power reception portion and said electric load device, for adjusting impedance of said non-contact electric power reception device; and a control device causing said matching device to adjust impedance of said non-contact electric power reception device when said electric power reception portion is arranged with positions in the horizontal direction of the central axis of said electric power reception portion and the central axis of said electric power transmission portion being displaced from each other.

5. The non-contact electric power reception device according to claim 1, further comprising:
a matching device provided between said electric power reception portion and said electric load device, for adjusting impedance of said non-contact electric power reception device; and
a control device causing said matching device to adjust impedance of said non-contact electric power reception device when said electric power reception portion is arranged with positions in a horizontal direction of a central axis of said electric power reception portion and a central axis of said electric power transmission portion matching with each other.

6. The non-contact electric power reception device according to claim 1, further comprising:
a matching device provided between said electric power reception portion and said electric load device, for adjusting impedance of said non-contact electric power reception device; and
a control device causing said matching device to adjust impedance of said non-contact electric power reception device when said electric power reception portion is arranged with positions in a horizontal direction of a central axis of said electric power reception portion and a central axis of said electric power transmission portion being displaced from each other.

7. The non-contact electric power reception device according to claim 1, wherein
said electric power reception portion is configured such that a difference in natural frequency from said electric power transmission portion is within ±10%.

8. The non-contact electric power reception device according to claim 1, wherein
a coefficient of coupling between said electric power reception portion and said electric power transmission portion is not greater than 0.1.

9. The non-contact electric power reception device according to claim 1, wherein
said electric power transmission portion transmits electric power to said electric power reception portion through at least one of magnetic field formed between said electric power reception portion and said electric power transmission portion and oscillating at a specific frequency and electric field formed between said electric power reception portion and said electric power transmission portion and oscillating at a specific frequency.

10. A non-contact electric power transmission device for transmitting electric power in a non-contact manner to an electric power reception device, said electric power reception device including an electric power reception portion and an electric load device configured to receive electric power from said electric power reception portion, comprising:
an electric power transmission portion configured to transmit electric power in a non-contact manner to said electric power reception portion; and
a power supply portion configured to supply AC power to said electric power transmission portion,
said electric power transmission portion including a resonant coil and an induction coil,
a distance between said resonant coil and said induction coil of said electric power transmission portion being set to achieve higher transmission efficiency at a predetermined power supply frequency of said power supply portion used for non-contact electric power transmission when said electric power reception portion is arranged in a state that its position is displaced by a predetermined distance from a position of said electric power transmission portion than in the case when said electric power reception portion and said electric power transmission portion are aligned, and
said electric power transmission portion is configured such that a peak frequency at which transmission efficiency at time of change in electric power transmission frequency exhibits a peak and said power supply frequency match with each other when said electric power reception portion is arranged with positions in a horizontal direction of a central axis of said electric power reception portion and a central axis of said electric power transmission portion being displaced from each other.

11. The non-contact electric power transmission device according to claim 10, wherein
said electric power transmission portion is configured to have peaks at which transmission efficiency is higher than transmission efficiency at said power supply frequency, a at least two locations of a first frequency higher than said power supply frequency and a second frequency lower than said power supply frequency, when said electric power reception portion is arranged with positions in the horizontal direction of the central axis of said electric power reception portion and the central axis of said electric power transmission portion matching with each other.

12. The non-contact electric power transmission device according to claim 11, further comprising:
a matching device provided between said electric power transmission portion and said power supply portion, for adjusting impedance of said non-contact electric power transmission device; and
a control device causing said matching device to adjust impedance of said non-contact electric power transmission device when said electric power reception portion is arranged with positions in the horizontal direction of the central axis of said electric power reception portion and the central axis of said electric power transmission portion matching with each other.

13. The non-contact electric power transmission device according to claim 11, further comprising:
a matching device provided between said electric power transmission portion and said power supply portion, for adjusting impedance of said non-contact electric power transmission device; and
a control device causing said matching device to adjust impedance of said non-contact electric power transmission device when said electric power reception portion is arranged with positions in the horizontal direction of the central axis of said electric power reception portion and the central axis of said electric power transmission portion being displaced from each other.

14. The non-contact electric power transmission device according to claim 10, further comprising:
a matching device provided between said electric power transmission portion and said power supply portion, for adjusting impedance of said non-contact electric power transmission device; and a control device causing said matching device to adjust impedance of said non-contact electric power transmission device when said electric power reception portion is arranged with positions in a horizontal direction of a central axis of said electric power reception portion and a central axis of said electric power transmission portion matching with each other.

15. The non-contact electric power transmission device according to claim 10, further comprising:
a matching device provided between said electric power transmission portion and said power supply portion, for adjusting impedance of said non-contact electric power transmission device; and
a control device causing said matching device to adjust impedance of said non-contact electric power transmission device when said electric power reception portion is arranged with positions in a horizontal direction of a central axis of said electric power reception portion and a central axis of said electric power transmission portion being displaced from each other.

16. The non-contact electric power transmission device according to claim 10, wherein
said electric power transmission portion is configured such that a difference in natural frequency from said electric power reception portion is within ±10%.

17. The non-contact electric power transmission device according to claim 10, wherein
a coefficient of coupling between said electric power reception portion and said electric power transmission portion is not greater than 0.1.

18. The non-contact electric power transmission device according to claim 10, wherein
said electric power transmission portion transmits electric power to said electric power reception portion through at least one of magnetic field formed between said electric power reception portion and said electric power transmission portion and oscillating at a specific frequency and electric field formed between said electric power reception portion and said electric power transmission portion and oscillating at a specific frequency.

19. A non-contact electric power transmission and reception system, comprising:
a non-contact electric power transmission device; and
a non-contact electric power reception device configured to receive in a non-contact manner, electric power transferred from said non-contact electric power transmission device,
said non-contact electric power transmission device including
an electric power transmission portion, and
a power supply portion for supplying AC power to said electric power transmission portion,
said non-contact electric power reception device including
an electric power reception portion equal in natural frequency to said electric power transmission portion, and
an electric load device configured to use electric power received by said electric power reception portion, and
said electric power reception portion including a resonant coil and an induction coil,
a distance between said resonant coil and said induction coil of said electric power reception portion being set to achieve higher transmission efficiency at a predetermined power supply frequency of said power supply portion used in non-contact electric power transmission when said electric power reception portion is arranged with its position being displaced by a predetermined distance from a position of said electric power transmission portion than in the case when said electric power reception portion and said electric power transmission portion are aligned, and
said electric power reception portion being, configured such that when said electric power reception portion is arranged with positions in a horizontal direction of a central axis of said electric power reception portion and a central axis of said electric power transmission portion being displaced from each other, a peak frequency a which transmission efficiency as a function of electric power transmission frequency exhibits a peak and said predetermined power supply frequency match with each other.

20. The non-contact electric power transmission and reception system according to claim 19, wherein
said electric power reception portion is configured such that a difference in natural frequency from said electric power transmission portion is within ±10%.

21. The non-contact electric power transmission and reception system according to claim 19, wherein
a coefficient of coupling between said electric power reception portion and said electric power transmission portion is not greater than 0.1.

22. The non-contact electric power transmission and reception system according to claim 19, wherein
said electric power transmission portion transmits electric power to said electric power reception portion through at least one of magnetic field formed between said electric power reception portion and said electric power transmission portion and oscillating at a specific frequency and electric field formed between said electric power reception portion and said electric power transmission portion and oscillating at a specific frequency.

* * * * *